(12) United States Patent
Ding et al.

(10) Patent No.: US 9,917,746 B2
(45) Date of Patent: Mar. 13, 2018

(54) ADAPTIVE ALLOCATION OF SERVER RESOURCES

(71) Applicant: Futurewei Technologies, Inc., Plano, TX (US)

(72) Inventors: Xinmin Ding, San Jose, CA (US); Yilin Gan, Shenzhen (CN); Huipeng Ren, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 522 days.

(21) Appl. No.: 14/532,507

(22) Filed: Nov. 4, 2014

(65) Prior Publication Data

US 2016/0127199 A1 May 5, 2016

(51) Int. Cl.
*G06F 15/173* (2006.01)
*H04L 12/24* (2006.01)
*H04L 29/08* (2006.01)

(52) U.S. Cl.
CPC .......... *H04L 41/5051* (2013.01); *H04L 67/02* (2013.01); *H04L 67/16* (2013.01)

(58) Field of Classification Search
USPC ........................................ 709/226, 203, 217
See application file for complete search history.

(56) References Cited

U.S. PATENT DOCUMENTS

| | | | |
|---|---|---|---|
| 6,529,950 B1 | 3/2003 | Lumelsky et al. | |
| 8,732,761 B2 * | 5/2014 | Mathews | H04N 5/44543 709/219 |
| 2010/0299437 A1 * | 11/2010 | Moore | H04L 67/1008 709/226 |

FOREIGN PATENT DOCUMENTS

| | | |
|---|---|---|
| CN | 103546442 A | 1/2014 |
| CN | 103929438 A | 7/2014 |
| CN | 104052826 A | 9/2014 |

OTHER PUBLICATIONS

Foreign Communication From a Counterpart Application, PCT Application No. PCT/CN2015/093799, International Search Report dated Feb. 3, 2016, 7 pages.
Foreign Communication From a Counterpart Application, PCT Application No. PCT/CN2015/093799, Written Opinion dated Feb. 3, 2016, 5 pages.

(Continued)

*Primary Examiner* — El Hadji Sall
(74) *Attorney, Agent, or Firm* — Conley Rose, P.C.

(57) ABSTRACT

A method of dynamically allocating media resources includes providing a plurality of microservices in a signaling server and receiving, by one of the microservices, a call message from a client capable of browser-to-browser communications. The call message includes an identifier specifying a target. The identifier is send by the microservice to a cache with a request for capability information of the target. The cache is configured to retrieve the capability information of the target using the identifier. The microservice receives the capability information of the target from the cache. The microservice sends a media resource request to a service directory server coupled to a plurality of media servers when the capability information of the target indicates that the target is not capable of browser-to-browser communications, and initiates browser-to-browser communications between the client and the target when the capability information of the target indicates the target is capable of browser-to-browser communications.

10 Claims, 9 Drawing Sheets

(56) References Cited

OTHER PUBLICATIONS

Rosenberg, et al., "SIP: Session Initiation Protocol," draft-ietf-sip-rfc2543bis-08.ps, Feb. 21, 2002, 194 pages.
Rosenberg, et al., "SIP: Session Initiation Protocol," RFC 3261, Jun. 2002, 269 pages.
Bergkvist, Ed. et al., WebRTC 1.0: Real-time Communication Between Browsers—W3C Editor's Draft Jul. 1, 2014, http://dev.w3.org/2011/webrtc/editor/webrtc.html, downloaded from the Internet Sep. 30, 2014, 60 pages.
Bergkvist, Ed. et al., WebRTC 1.0: Real-time Communication Between Browsers—W3C Working Draft Sep. 10, 2013, http://www.w3.org/TR/webrtc, downloaded from the Internet Sep. 30, 2014, 54 pages.

\* cited by examiner

ADAPTIVE ALLOCATION OF SERVER RESOURCES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A web browser (commonly referred to as a browser) is a software application for retrieving, presenting, and traversing information resources on the World Wide Web. Some web browsers utilize a technology referred to a Web Real-Time Communications (WebRTC). WebRTC is an application programming interface (API) drafted by the Worldwide Web Consortium (W3C) that supports browser-to-browser application for video-calling, video chat, peer-to-peer (P2P) file sharing, and the like, without requiring a plugin in the browser.

Many mobile devices (e.g., smart phones, tablets) do not include or support the WebRTC technology. Therefore, the mobile device is not capable of browser-to-browser communications with a client who is using, for example, a personal computer that does include or support the WebRTC technology. Because of the mismatch in browser capability, a plugin or other additional software may need to be loaded onto the mobile device to support browser-to-browser communications.

In addition, in the existing WebRTC architecture, a plurality of signaling servers (a.k.a., signaling hosts) and a plurality of media servers (a.k.a., media hosts) are used to facilitate communications between, for example, the client and a target (e.g., the user of the mobile device). At bootstrap time, each media server is bound to one signaling server. In others words, each signaling server is manually configured to communicate with only one media server. This allocation of one media server for each signaling server is static. In the event that a media server fails, the corresponding signaling server may be unaware of the failure. Thus, the signaling server may continue to accept traffic while the corresponding media server is down, which may lead to an undesirable service issue.

SUMMARY

In one embodiment, the disclosure includes a service discovery server capable of dynamically allocating media server resources. The service discovery service includes a processor operably coupled to a memory and a service discovery module stored in the memory that, when executed by the processor is configured to receive a media resource request from one of a plurality of microservices in a signaling server, the media resource request indicating that a target is not capable of browser-to-browser communications with a client, and allocate at least one of a plurality of microservices in a media server in response to receipt of the media resource request such that the client is capable of engaging in communications with the target.

In another embodiment, the disclosure includes a method of dynamically allocating media server resources. The method includes providing a plurality of microservices in a signaling server and receiving, by a first one of the microservices, a call message from a client capable of browser-to-browser communications. The call message includes an identifier specifying a target. The method includes sending, by the first one of the microservices, the identifier to a cache with a request for capability information of the target. The cache is configured to retrieve the capability information of the target using the identifier. The method further includes receiving, by the first one of the microservices, the capability information of the target from the cache in response to the request for the capability information. The method includes sending, by the first one of the microservices, a media resource request to a service directory server operably coupled to a plurality of media servers when the capability information of the target indicates that the target is not capable of browser-to-browser communications and initiating, by the first one of the microservices, browser-to-browser communications between the client and the target when the capability information of the target indicates the target is capable of browser-to-browser communications.

In yet another embodiment, the disclosure includes a method of dynamically allocating media server resources. The method includes providing a pool of microservices in a signaling server and receiving, by a first one of the microservices, a call message from a client. The call message includes a client identifier and a target identifier. The method includes sending, by the first one of the microservices, the client identifier and the target identifier to a cache with a request for capability information of a client corresponding to the client identifier and for capability information of a target corresponding to the target identifier and receiving, by the first one of the microservices, the capability information of the client and the capability information of the target from the cache in response to the request. The method includes sending, by the first one of the microservices, a media resource request to a service directory server operably coupled to a plurality of media servers when the capability information of the client indicates that the client is capable of browser-to-browser communications and the capability information of the target indicates that the target is not capable of browser-to-browser communications.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are various embodiments for adaptive allocation of server resources in a WebRTC environment or architecture. As will be more fully explained below, the adaptive allocation of server resources disclosed herein permits efficient use of media servers based on actual traffic. The adaptive allocation also permits services to be rapidly scaled up or scaled down based on WebRTC specific parameters. Further, a signaling gateway and various media servers are only loosely coupled instead of there being a one-to-one relationship between each signaling gateway and a corresponding media server. In other words, the signaling server in the present disclosure does not have a static link to the media resources. Additionally, a service discovery layer manages the media services in a pool, which simplifies a large scale server deployment. Because the service discovery layer manages the media servers, the signaling server need not be involved in the home agent (HA) process.

Figure 1:
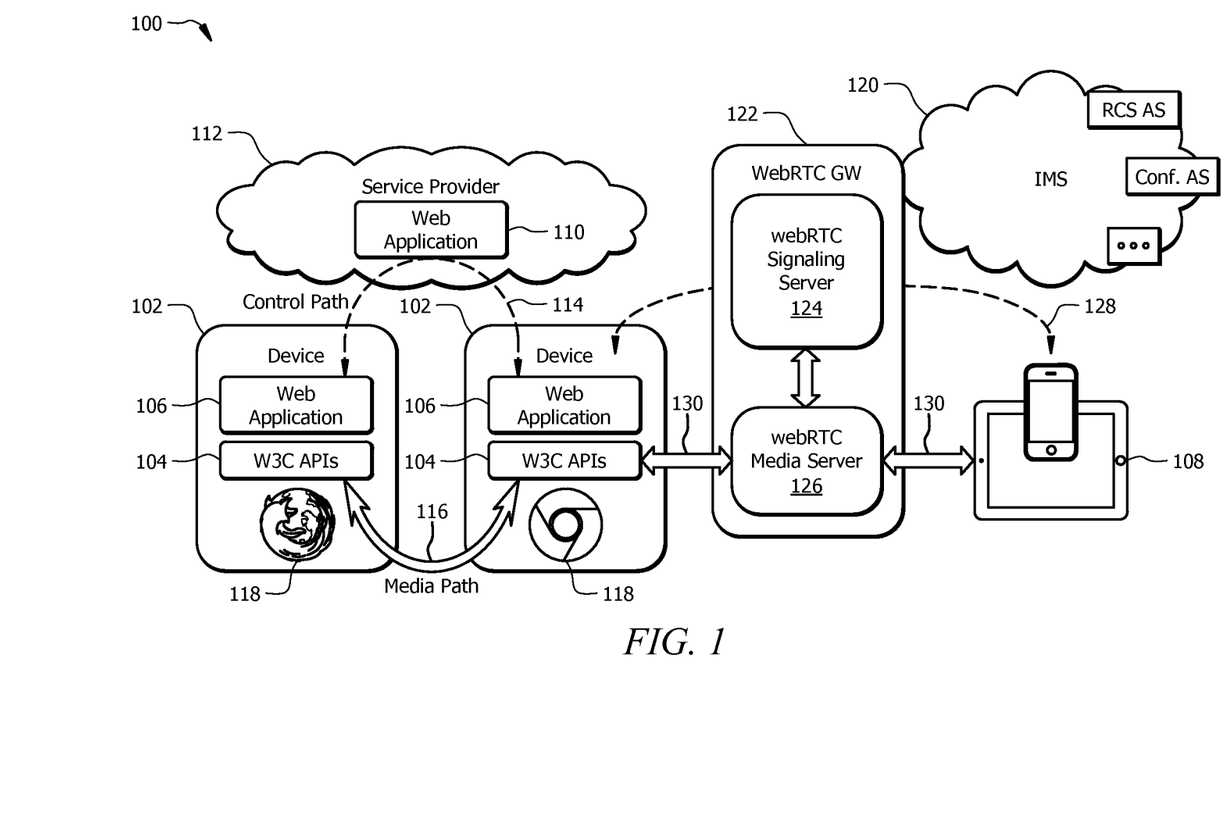
FIG. 1 is a schematic diagram of a WebRTC system.

FIG. 1 is a schematic diagram of a WebRTC system 100. WebRTC is described in more detail in the W3C Working Draft 10 document WebRTC 1.0: Real-time Communication Between Browser published in September 2013, and in the W3C Editor's Draft 01 document WebRTC 1.0: Real-time Communication Between Browser published in July 2014, both of which are incorporated herein by reference as if reproduced in their entirety.

As shown in FIG. 1, the WebRTC system 100 includes one or more computing devices, which for convenience will be referred to herein as clients 102. In some embodiments, one or both of the clients 102 is a personal computer (PC), tablet computer, or mobile phone. In some embodiments, each client 102 includes one or more W3C APIs 104 used to handle a web application 106. By way of example, the web application 106 is a web application used to make video calls (e.g., Microsoft Skype™) or to otherwise facilitate communication between the clients 102 or between one of the clients 102 and a target 108.

The web application 106 of each client 102 is configured to communicate with the corresponding web application 110 of a service provider 112 through a control path 114. As such, the service provider 112 provides the appropriate signaling to facilitate, for example, a video call between the clients 102. The media for the video call is exchanged between the clients 102 through a media path 116.

Each client 102 also includes a browser 118 (e.g., Mozilla Firefox®, Google Chrome®, Microsoft Internet Explorer®, or Apple Safari®). The browser permits a user of the client 102 to interact with the web application 106. In some cases, the browser 118 of the client 102 is configured to support WebRTC communications. When the browser 118 of the client 102 includes support for WebRTC, the clients 102 are able to engage in browser-to-browser communications without the need for a plugin.

As an example, when one client 102 wants to initiate a video call with the other client 102, the web application 106 of the client 102 initiating the video call contacts the web application 110 of the service provider 112 to request that the service provider 112 provide the signaling to facilitate the call. The web application 110 of the service provider 112 provides the requested signaling using the control path 114 and the clients 102 exchange media over the media path 116. When the user of one client 102 wants to end the video call, the web application 106 of that client 102 advises the web application 110 of the service provider 112 of the desire to end the call, the signaling used to facilitate the video call ceases, and the exchange of media between the clients 102 over the media path 116 ends.

In some circumstances, the target 108 is a mobile device (e.g., a smart phone, tablet, etc.) that communicates though an Internet Protocol (IP) multimedia system (IMS) 120, a circuit switch (CS), or a public switched telephone network (PSTN) and does not support WebRTC. Because the target 108 does not support WebRTC, the clients 102 are unable to engage in browser-to-browser communications with the target 108. Indeed, the codec used for encoding and decoding the digital data stream or signal of the target 108 is different than the codec used for encoding and decoding the digital data stream or signal of the client 102. In order for the target 108 to communicate with one of the clients 102, a WebRTC gateway 122 is utilized. The WebRTC gateway 122 extends, for example, the IMS subscribers (e.g., the target 108) to the web domain of the service provider 112 and enables those subscribers to enjoy existing services such as, for example, Rich Communication Services (RCS), conference as a service, and so on.

The WebRTC gateway 122 is configured to convert the digital data stream or signals from the clients 102 into a format that the target 108 is capable of utilizing, and vice versa. The WebRTC gateway 122 is also configured to provide the signaling needed to facilitate communications between the clients 102 and the target 108. In some embodiments, the WebRTC gateway 122 comprises a signaling server 124 and a media server 126. As used herein, the signaling server 124 may be referred to as a signaling gateway and the media server 126 may be referred to as a media gateway. As shown, the signaling server 124 and the media server 126 are operably coupled to each other. While the signaling server 124 and the media server 126 are shown proximate one another in FIG. 1, the signaling server 124 and the media server 126 may be remotely located from each other in some embodiments.

The signaling server 124 is configured to handle a Hypertext Transfer Protocol (HTTP) session and a session initiation protocol (SIP) session. Therefore, the signaling server 124 is able to provide the signaling for communication between the clients 102 and the target 108 through a control path 128. For example, the signaling server 124 uses the control path 128 to send a phone call notification to the target 108 when one of the clients 102 is attempting to place a video call to the target 108.

As shown in FIG. 1, the media server 126 provides media to the clients 102 and to the target 108 through a media path 130 extending between the WebRTC gateway 122 and the clients 102 and between the WebRTC gateway 122 and the target 108. Thus, media (e.g., data from a video call) from one of the clients 102 is delivered to the media server 126 in the WebRTC gateway 122 over the media path 130, converted into a format consistent with the target 108 by the media server 126, and then delivered by the media server 126 to the target 108 over the media path 130. Likewise, media from the target 108 is delivered to the media server 126 in the WebRTC gateway 122 over the media path 130, converted into a format consistent with the client 102 by the media server 126, and then delivered by the media server 126 to the client 102 over the media path 130. In this fashion, the clients 102 and the target 108 are able to participate in communications such as video calls, video chats, peer-to-peer file sharing, and so on.

Figure 2:
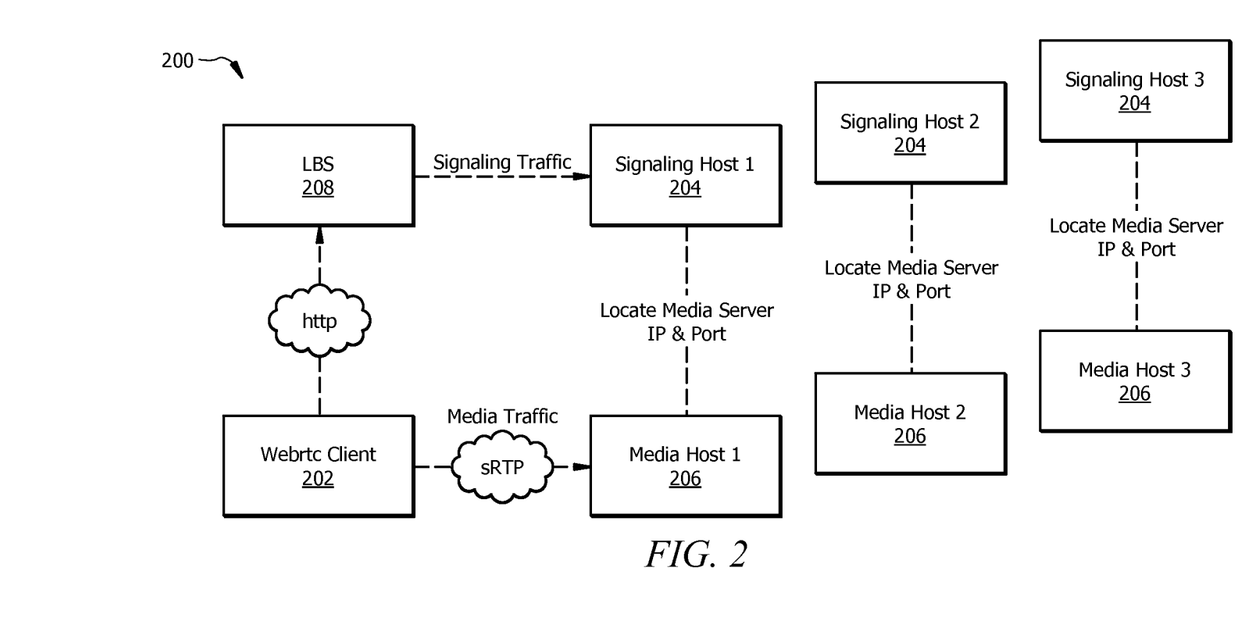
FIG. 2 is a schematic diagram of communications in a WebRTC system.

FIG. 2 is a schematic diagram of communications in a WebRTC system 200. As shown in FIG. 2, the WebRTC system 200 includes a client 202. In some embodiments, the client 202 is configured similar to the clients 102 described in FIG. 1. The WebRTC system 200 also includes signaling hosts 204 and media hosts 206. In some embodiments, the signaling hosts 204 and the media hosts 206 are configured similar to the signaling server 124 and the media server 126 described in FIG. 1, respectively. Each signaling host 204 is manually configured by, for example, a network operator to correspond to one of the media hosts 206. In other words, there is a static, one-to-one relationship between one signaling host 204 and one media host 206.

As shown in FIG. 2, when a video call, for example, is initiated by the client 202, the client 202 sends an HTTP message to a load balancer server (LBS) 208. The LBS 208 makes a determination of which signaling host 204 (e.g., signaling host 1, signaling host 2, signaling host 3, etc.) to utilize for the video call based on, for example, network traffic, a keep alive detection mechanism, traffic burden of a signaling host, and so on. The signaling host 204 selected (e.g., Signaling Host 1) receives the HTTP message and converts that message to a SIP format. The signaling host 204 then locates the media server IP address and user datagram protocol (UDP) port for the media host 206 (e.g., Media Host 1) assigned to the signaling host 204 and sends the converted message to the media host 206.

Once the media host 206 has received the converted message, media traffic is exchanged between the client 202 and the media host 206 using, for example, a secure real time transport protocol (sRTP). Because of the static one-to-one relationship between the signaling host 204 (e.g., Signaling Host 1) and the media host 206 (e.g., Media Host 1), if the media host 206 fails or encounters service issues, the corresponding signaling host 204 continues to accept traffic. Indeed, the signaling host 204 may be unaware that the media host 206 is experiencing problems. This may cause an undesirable service issue in the WebRTC system 200.

In addition, the media host 206 is a resource hungry device. Typically, a production system needs to predict the media traffic and prepare a number of media hosts 206 to live all the time to prepare for anticipated traffic. Thus, the media host 206 is not efficiently utilized, even when there is light media traffic. Dynamic allocation of media hosts 206 is not feasible because the start-up time for a media host 206 is relatively large (e.g., a minute or more). In addition, the resource control granularity is too coarse-grained. If there is a need to dynamically increase resources for mass production, the media host 206 is not suitable because the start time is too long and provisioning is complex. Moreover, complex configurations are needed between the signaling host 204 and the media host 206 in terms of a mass production system network.

In addition, implementing a media host 206 fail solution is difficult. If a media host 206 is down while the corresponding signaling host 204 is still alive, the traffic from the client 202 should not route to that signaling server 204 any longer as the signaling server/media server pair is in a malfunctioning state. To prevent the traffic from routing to the signaling server 204 when the corresponding media server 206 has malfunctioned, a feedback mechanism capable of notifying the load balancer 208 to skip the particular signaling server 204 is needed. However, such a mechanism brings more complex implementations.

Figure 3:
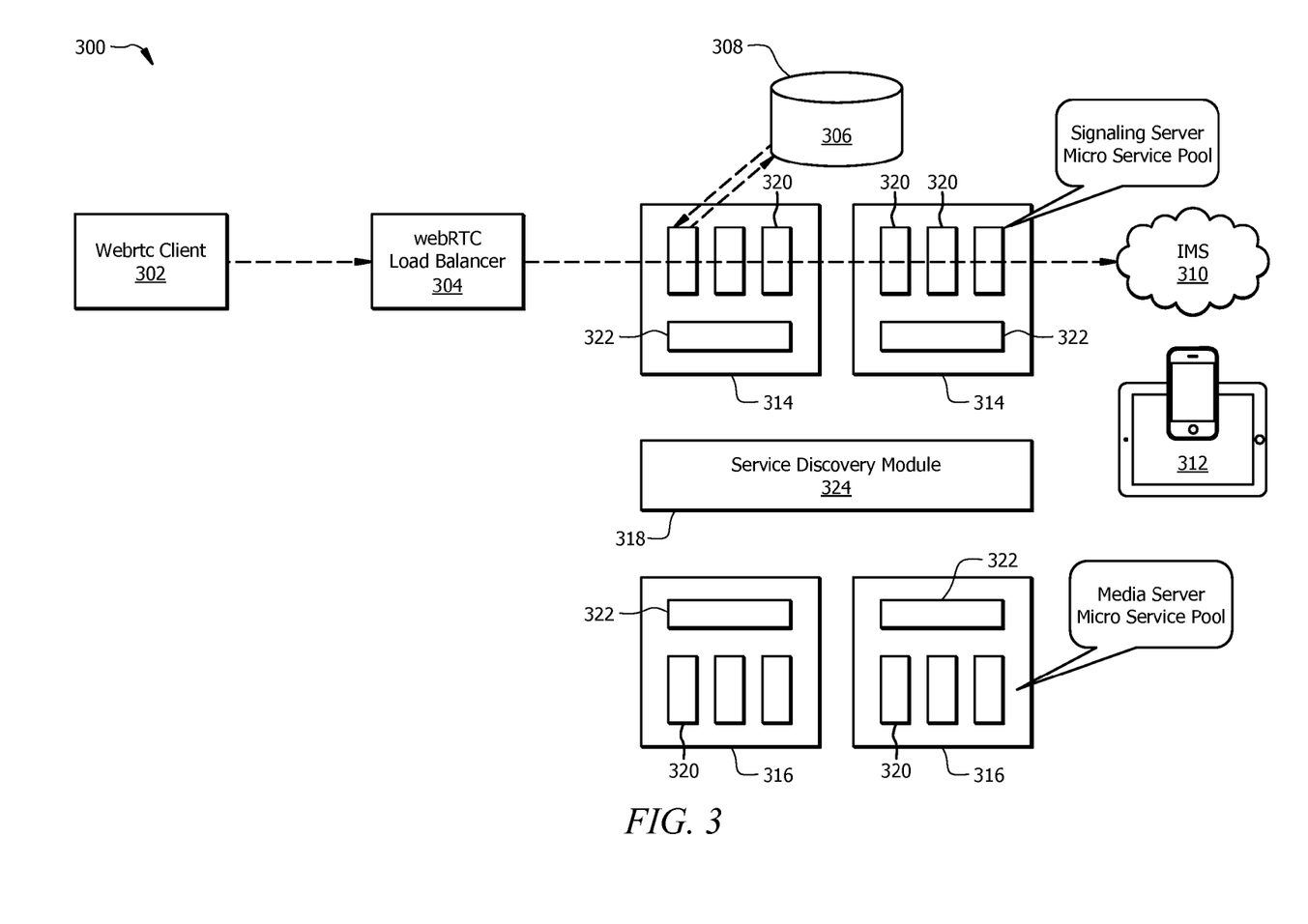
FIG. 3 is a schematic diagram of an embodiment of a WebRTC system.

To address the issue of a target 108 (e.g., a mobile device) not being WebRTC-enabled and to address the issue of a static, one-to-one relationship of each signaling server 204 to one of the media servers 206, a dynamic and adaptive server resource allocation solution is provided. In that regard, FIG. 3 is a schematic diagram of an embodiment of a WebRTC system 300 that solves the foregoing problems. The WebRTC system 300 is configured to communicate with a client 302 and an LBS 304. In some embodiments, the client 302 and the LBS 304 are configured similar to the clients 102 and the load balancer 208 described in FIGS. 1-2. In an embodiment, the LBS 304 functions or is referred to as a WebRTC router. The WebRTC system 300 is also configured to communicate with a distributed cache service 306 residing or operating on a cache server 308.

The cache service 306 operating on the cache server 308 provides a mechanism for the temporary storage (caching) of a variety of data and information. In an embodiment, the cache service 306 stores a list of devices (e.g., clients and/or targets) and the capability of each device as, for example, either WebRTC-enabled or not WebRTC-enabled. In some embodiments, the cache service 306 stores the list in an index or table where each device is stored in connection with an identifier such as a phone number. Therefore, when the cache server 308 receives the phone number of a particular device, the cache service 306 is able to look up the capability of that device using the phone number. The cache service 306 operating on the cache server 308 then reports the device capability information of the device back to the requesting entity. The WebRTC system 300 is also configured to communicate an IMS 310 and a target 312. In some embodiments, the IMS 310 and the target 312 are configured similar to the IMS 120 and the target 108 described in FIG. 1.

In some embodiments, the WebRTC system 300 includes a plurality of signaling servers 314, a plurality of media servers 316, and a service discovery server 318. In some embodiments, the signaling servers 314 and the media servers 316 are configured similar to the signaling server 124, 204 and the media server 126, 206 described in FIGS. 1-2, respectively. However, as shown in FIG. 3, the signaling servers 314 and the media servers 316 in FIG. 3 each include a pool of microservices 320 and a service discovery agent 322.

The microservices 320 operating in the signaling servers 314 and media servers 316 are suites of independently deployable services. The term microservices contemplates a software architecture design pattern in which complex applications are composed of small, independent processes communicating with each other using language-agnostic APIs.

The microservices 320 are small, highly decoupled, and may focus on doing a small task. In other words, the microservice architectural style is an approach to developing a single application as a suite of small services, each running in its own process and communicating with lightweight mechanisms (e.g., an HTTP resource API).

The microservices 320 are easy to replace relative to a monolithic service that performs all or many of the same functions. Moreover, each of the microservices 320 may be updated without adversely affecting the other microservices 320. In contrast, updates to one portion of a monolithic service may undesirably or unintentionally negatively affect the other portions of the monolithic service. Microservices 320 may be beneficially organized around their capabilities.

The startup time for the microservices 320 is much less than the startup time for a single application that collectively performs all the services of the microservices. In some embodiments, the startup time for each of the microservices 320 is about one second or less relative to the startup time of the single application, which may be about a minute, several minutes, or longer.

The discovery agent 322 is configured to, for example, send messages to, and receive messages from, the service discovery server 318. In some embodiments, the discovery agent 322 is configured to translate messages from one format into another. For example, the discovery agent 322 in the signaling server 314 is configured to translate a message received from the client 302 into a format compatible with the service discovery server 318.

As shown in FIG. 3, the service discovery server 318 operates a service discovery service or module 324 to implement some or all of the functionality of the service discovery server 318. The service discovery server 318 is interposed between the signaling servers 314 and the media servers 316. As such, the service discovery server 318 exchanges messages with both the signaling servers 314 and the media servers 316. As will be more fully explained below, the service discovery server 318 is capable of dynamically allocating the resources of the media servers 316. In some embodiments, the service discovery module 324 prevents the signaling servers 314 from seeing details of the microservices 320 in the media servers 316. In some embodiments, the service discovery module 324 prevents the signaling servers 314 from seeing details pertaining to the pool of media servers 316. The service discovery server 318 is configured to allocate a new microservice 320 in one of the media servers 316 upon failure of a previously-allocated microservice 320. In some embodiments, the new microservice 320 is in the same media server 316 as before, or is in a new media server 316 not yet accessed.

Figure 4:
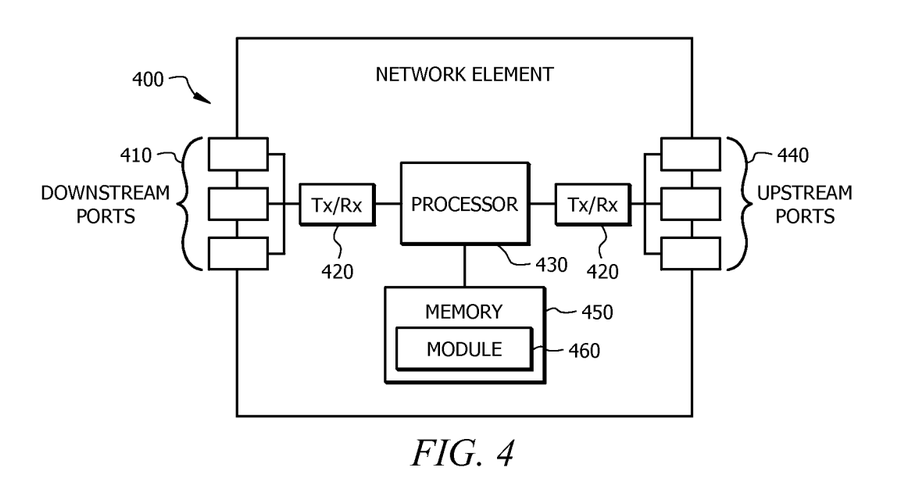
FIG. 4 is a schematic diagram of an embodiment of a server used to transport and process data traffic or information through the WebRTC system of FIG. 3.

FIG. 4 is a schematic diagram of an embodiment of a server 400 used to transport and process data traffic or information through at least a portion of the WebRTC system 300 shown in FIG. 3. At least some of the features/methods described in the disclosure may be implemented in the server 400. For instance, the features/methods of the disclosure may be implemented in hardware, firmware, and/or software installed to run on the hardware. The server 400 is any device that transports data through a network, system, and/or domain. Moreover, the terms server, computer, logic device, and/or similar terms are interchangeably used to generally describe a server and do not have a particular or special meaning unless otherwise specifically stated and/or claimed within the disclosure.

In one embodiment, the server 400 is an apparatus configured to dynamically and adaptively allocate resources of the media servers 316 of FIG. 3. In addition, components or functions of the server 400 are implemented in and/or integrated within the media servers 316, the signaling servers 314, and the service discovery server 318 as described in FIG. 3.

The server 400 comprises one or more downstream ports 410 coupled to a transceiver (Tx/Rx) 420, which may be transmitters, receivers, or combinations thereof. The Tx/Rx 420 transmits and/or receives messages or information from other network devices (e.g., servers, etc.) via the downstream ports 410. Similarly, the server 400 comprises another Tx/Rx 420 coupled to a plurality of upstream ports 440, wherein the Tx/Rx 420 transmits and/or receives messages or information from other network devices via the upstream ports 440. The downstream ports 410 and/or the upstream ports 440 include electrical and/or optical transmitting and/or receiving components.

A processor 430 is coupled to the Tx/Rx 420 and is configured to process the messages or information and/or determine which servers to send (e.g., transmit) the messages or information to. In an embodiment, the processor 430 comprises one or more multi-core processors and/or memory modules 450, which function as data stores, buffers, etc. In some embodiments, the processor 430 is implemented as a general processor or as part of one or more application specific integrated circuits (ASICs), field-programmable gate arrays (FPGAs), and/or digital signal processors (DSPs). Although illustrated as a single processor, the processor 430 is not so limited and may comprise multiple processors. The processor 430 is configured to the adaptive and dynamic allocation of media resources described herein.

FIG. 4 illustrates that a memory 450 is coupled to the processor 430 and is a non-transitory medium configured to store various types of data. In some embodiments, memory 450 comprises memory devices including secondary storage, read-only memory (ROM), and random-access memory (RAM). The secondary storage is typically comprised of one or more disk drives, optical drives, solid-state drives (SSDs), and/or tape drives and is used for non-volatile storage of data and as an over-flow storage device if the RAM is not large enough to hold all working data. The secondary storage may be used to store programs that are loaded into the RAM when such programs are selected for execution. The ROM is used to store instructions and perhaps data that are read during program execution. The ROM is a non-volatile memory device that typically has a small memory capacity relative to the larger memory capacity of the secondary storage. The RAM is used to store volatile data and perhaps to store instructions. Access to both the ROM and RAM is typically faster than to the secondary storage.

The memory 450 is used to house the instructions for carrying out the various example embodiments described herein. In one example embodiment, the memory 450 comprises a module 460, which represents the service discovery module 324, the discovery agent 322, or the microservices 320 shown in FIG. 3. In some embodiments, the memory 450 stores instructions capable of implementing the dynamic allocation method 800 of FIG. 8, the registration method 900 of FIG. 9, or the method 1000 of dynamically allocating media server resources of FIG. 10.

It is understood that by programming and/or loading executable instructions onto the server 400, at least one of the processor 430, the cache, and the long-term storage are changed, transforming the server 400 in part into a particular machine or apparatus, for example, a multi-core forwarding architecture having the novel functionality taught by the present disclosure. It is fundamental to the electrical engineering and software engineering arts that functionality that can be implemented by loading executable software into a computer can be converted to a hardware implementation by well-known design rules known in the art. Decisions between implementing a concept in software versus hardware typically hinge on considerations of stability of the design and number of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable will be produced in large volume may be preferred to be implemented in hardware (e.g., in an ASIC) because for large production runs the hardware implementation may be less expensive than software implementations. Often a design may be developed and tested in a software form and then later transformed, by well-known design rules known in the art, to an equivalent hardware implementation in an ASIC that hardwires the instructions of the software. In the same manner as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose multi-core processor) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc read-only memory (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Figure 5:
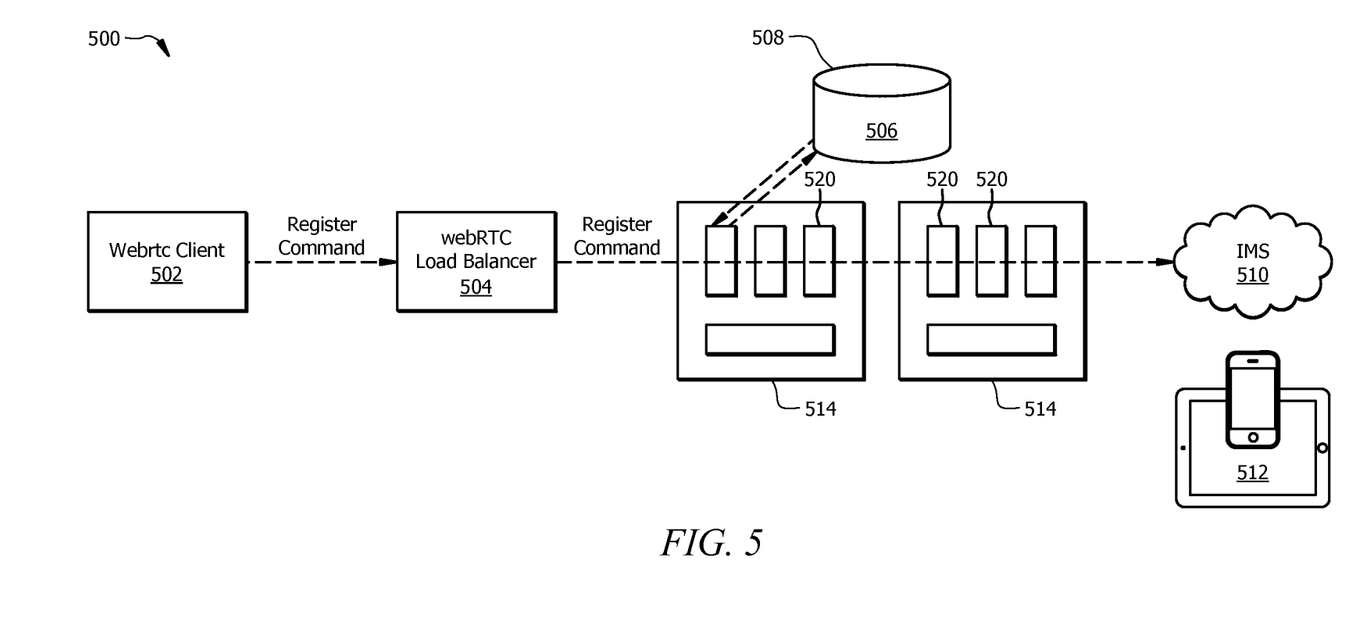
FIG. 5 is a schematic diagram of an embodiment of a registration process within the WebRTC system of FIG. 3.

FIG. 5 is a schematic diagram of an embodiment of a registration process within a WebRTC system 500. In some embodiments, the client 502, LBS 504, cache server 508, signaling server 514, IMS 510, and target 512 are configured similar to corresponding devices described in connection with the WebRTC system 300 of FIG. 3. The client 502 sends a register command (e.g., register message) to the LBS 504. In some embodiments, the register command sent to the LBS 504 is a SIP REGISTER request. The REGISTER request is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety. In some embodiments, the register command includes an identifier identifying the client 502 and information regarding the capability of the client 502.

The LBS 504 relays the register command to one of the microservices 520 in the signaling server 514. Upon receipt of the register command, the microservice 520 sends a SIP OK response to the client 502 to advise the client 502 that the message was successfully received. The OK response is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety.

The microservice 520 receiving the register command sends the register command (or a portion thereof) to the IMS 510. The register command prompts the target 512 to register its identifier (e.g., phone number) and device capability with the cache service 506 operating in the cache server 508. If the identifier of the target 512 is not found in the cache server 508, the cache service 506 stores the identifier of the target 512 along with the capability of that target 512 in the index. If the identifier is found in the cache server 508, the cache service 506 compares the stored capability of the target 512 with the current capability of the target 512. If there is a mismatch, the cache service 506 updates the stored capability of the target 512 to reflect the current capability of the target 512.

The microservice 520 receiving the register command from the client 502 parses the register command to obtain an identifier identifying the client 502 and to determine a capability of the client 502. In some embodiments, the client identifier is a phone number. Those skilled in the art will recognize that another identifier or number may be used after consideration of this disclosure. In some embodiments, the capability of the client 502 reveals whether the client 502 is a WebRTC-enabled device or is not a WebRTC-enabled device. In other words, the capability indicates whether the client 502 is capable of browser-to-browser communications (i.e., WebRTC-enabled) or whether the client 502 is not capable of browser-to-browser communications (i.e., not WebRTC-enabled).

After parsing the register command, the microservice 520 requests that the distributed cache service 506 operating on the cache server 508 perform an update, if needed. Upon receiving the update request, the cache service determines if the identifier of the client 502 is stored in the index of the cache service. If the identifier of the client 502 is not found in the cache server 508, the cache service 506 stores the identifier of the client 502 along with the capability of that client 502 in the index. If the identifier is found in the cache server 508, the cache service 506 compares the stored capability of the client 502 with the current capability of the client 502. If there is a mismatch, the cache service updates the stored capability of the client 502 to reflect the current capability of the client 502. The microservice 520 sends the update request to the cache server 508 before, after, or at the same time that the microservice 520 sends the register command to the IMS 510, which may be relayed to the target 512.

Figure 6:
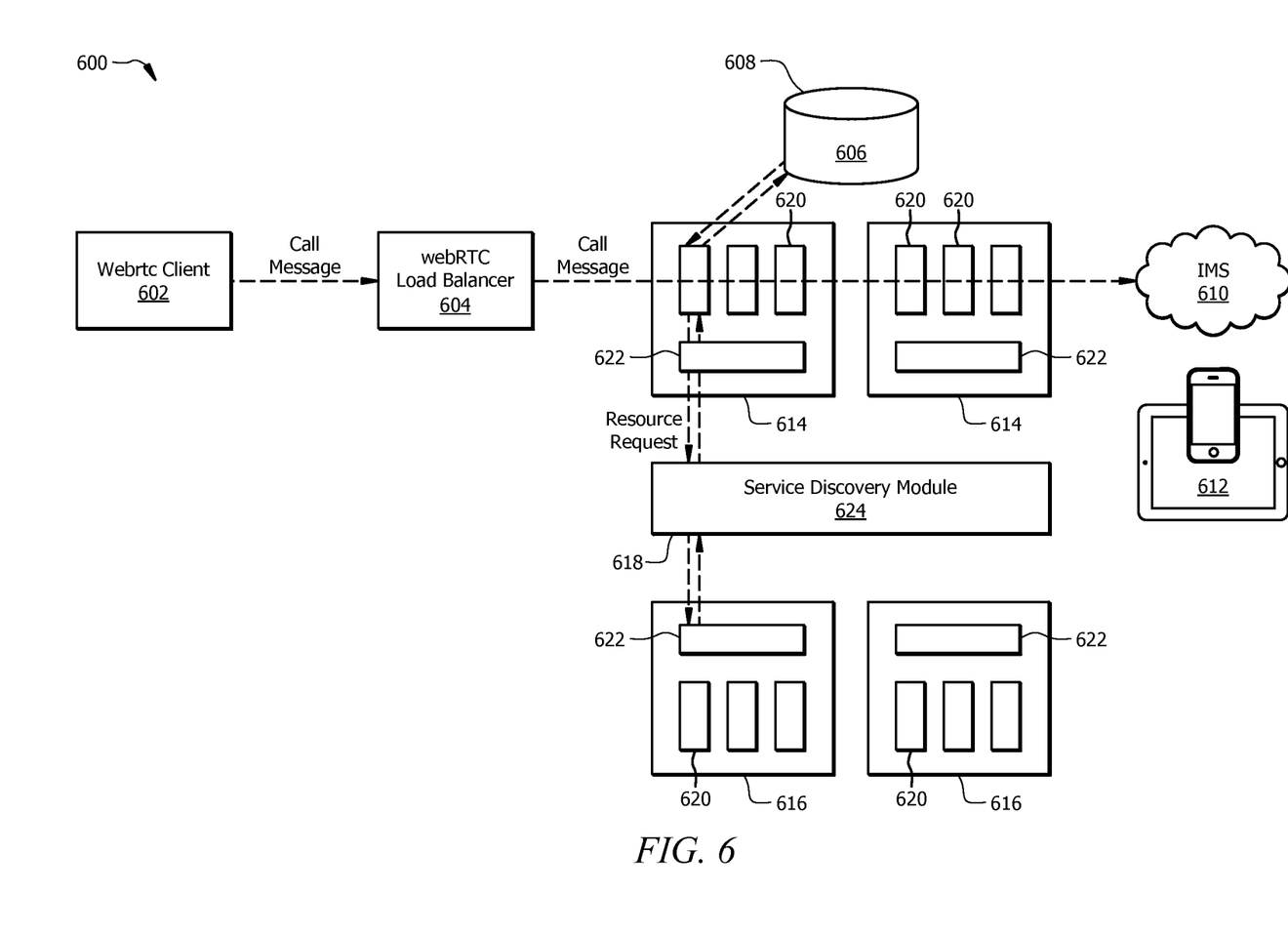
FIG. 6 is a schematic diagram of an embodiment of a call process within the WebRTC system of FIG. 3.

FIG. 6 is a schematic diagram of an embodiment of a call process within the WebRTC system 600. In some embodiments, the client 602, LBS 604, cache server 608, signaling server 614, IMS 610, target 612 are configured similar to corresponding devices described in connection with the WebRTC system 500 of FIG. 5. The client 602 sends a call message to the LBS 604. In some embodiments, the call message sent to the LBS 604 is a SIP INVITE request. The INVITE request is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety. In some embodiments, the call message includes an identifier identifying the client 602 and an identifier identifying the target 612.

The LBS 604 relays the call message to one of the microservices 620 in the signaling server 614. Upon receipt of the call message, the microservice 620 sends a SIP OK response to the client 602 to advise the client 602 that the message was successfully received. The OK response is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety.

The microservice 620 receiving the call message sends the call message (or a portion thereof) to the IMS 610. The call message sent to the IMS 610 requests that a carrier network associated with the target 612 identify a location of the target 612. In some embodiments, the call message also causes a ring tone to activate on the target 612. In other words, the call message prompts the target 612 to ring to indicate an incoming call (e.g., video call) from the client 602.

The microservice 620 receiving the call message parses the call message to obtain the identifier identifying the client 602 and to obtain the identifier identifying the target 612. In some embodiments, the client identifier and the target identifier are each phone numbers. Those skilled in the art will recognize that other identifiers or numbers may be used after consideration of this disclosure.

After parsing the call message, the microservice 620 sends the client identifier and the target identifier to the cache server 608. The microservice 620 sends the client and target identifiers to the cache server 608 before, after, or at the same time that the microservice 620 sends the call message to the IMS 610. In some embodiments, the microservice 620 receives the call message from a client 602 that the microservice 620 knows is WebRTC-enabled. Therefore, the microservice 620 sends only the target identifier to the cache server 608.

The cache service 606 operating in the cache server 608 uses the client identifier to look up the capability of the client 602 and the target identifier to look up the capability of the target 612 in the identifier/capability index stored in the cache server 608. The cache service 606 then sends a response message to the microservice 620 in the signaling server 614 that indicates whether the client 602 and the target 612 are WebRTC-enabled or not WebRTC-enabled. In other words, the response message indicates whether the client 602 and the target 612 are capable of browser-to-browser communications (i.e., WebRTC-enabled) or not capable of browser-to-browser communications (i.e., not WebRTC-enabled).

With the information in the response message, the microservice 620 determines whether the client 602 and the target 612 are able to engage in browser-to-browser communications. If the client 602 and the target 612 are both capable of browser-to-browser communications, the microservice 620 initiates the browser-to-browser communication (e.g., a video call, a video chat, etc.). If either the client 602 or the target 612 is incapable of browser-to-browser communica-tions, the microservice 620 sends a media resource request to the service discovery server 618 in order to request sufficient media resources to facilitate communications between the client 602 and the target 612.

When the service discovery server 618 receives the request, the service discovery module 624 allocates one or more microservices 620 in any of the media servers 616 so the client 602 is capable of engaging in communications (e.g., browser-to-mobile communications) with the target 612. The service discovery module 624 is configured to make a determination of whether additional microservices are needed to support the communications between the client 602 and the target 612 prior to the communications between the client 602 and the target 612 starting. In some embodiments, the service discovery module 624 makes a determination of whether a number of the microservices 620 needed to support the communications between the client 602 and the target 612 is below a predetermined threshold. If so, the service discovery module 624 instructs one or more of the media servers 616 to start one or more of their microservices 620.

In an embodiment, the one or more media servers 616 called upon to provide microservices 620 sends a message to the service discovery module 624 operating in the service discovery server 618 indicating the microservices 620 are available, operating properly, and so on. Once the message is received by the service discovery module 624, the service discovery module 624 sends a message to the one or more microservices 620 in the signaling server 614 indicating that communications using the allocated microservices in the media servers 616 may be initiated between the client 602 and the target 612.

In an embodiment, the signaling servers 614 and/or the media servers 616 include a service discovery agent 622 configured to translate messages sent to the service discovery module 624 into a format compatible with the service discovery module 624 and to translate messages received from the service discovery module 624 into a format compatible with the signaling server 614 or the media server 616.

When the client 602 or the target 612 desires to terminate communications, the client 602 or target 612 sends a termination request message to the microservice 620 in the signaling server 614. In some embodiments, the termination request message sent to the signaling server 614 is a SIP BYE request. The BYE request is described in more detail in the Internet Engineering Task Force (IETF) document, draft-ietf-sip-rfc2543bis-08.txt, published Feb. 21, 2002, and the Request for Comments (RFC) document, RFC 3261, published June 2002, both of which are incorporated herein by reference as if reproduced in their entirety. The signaling server 614 forwards the termination request message to the service discovery module 624 in the service discovery server 618, which then shuts down the media resources.

Figure 7:
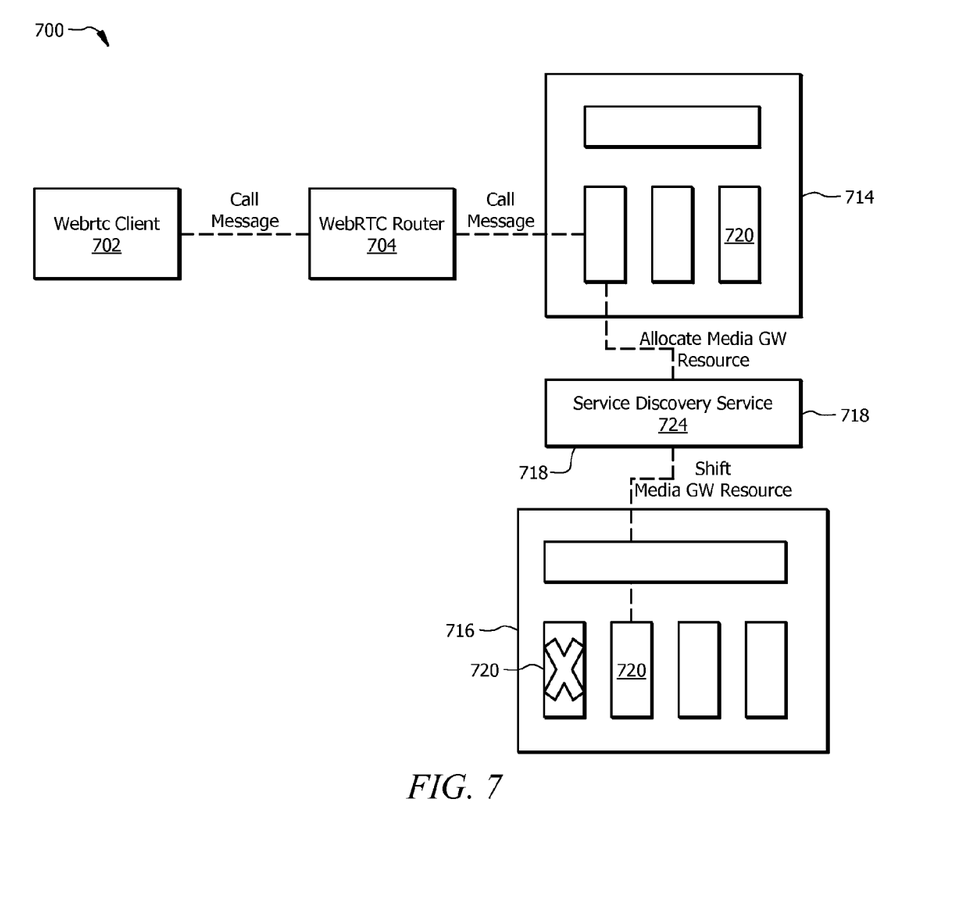
FIG. 7 is a schematic diagram of an embodiment of a dynamic allocation process within the WebRTC system of FIG. 3.

FIG. 7 is a schematic diagram of an embodiment of a dynamic allocation process within the WebRTC system 700. In some embodiments, the client 702, router 704, signaling server 714, service discovery server 718, and media server 716 are configured similar to corresponding devices described in connection with the WebRTC system 600 of FIG. 6. As shown, in the event of a failure of a microservice 720 in one of the media servers 716, the service discovery module 724 of the service discovery server 718 is configured to rapidly shift to another microservice 720 (e.g., another media resource) in the media server 716. In some embodiments, in the event of a failure of a microservice 720 in one of the media servers 716, the service discovery module 724 is configured to rapidly shift to another microservice (e.g., another media resource) in an entirely different media server 716. As shown in FIG. 7, despite the shift from one microservice 720 to another, the same microservice 720 in the signaling server 714 may continue to be used.

Figure 8:
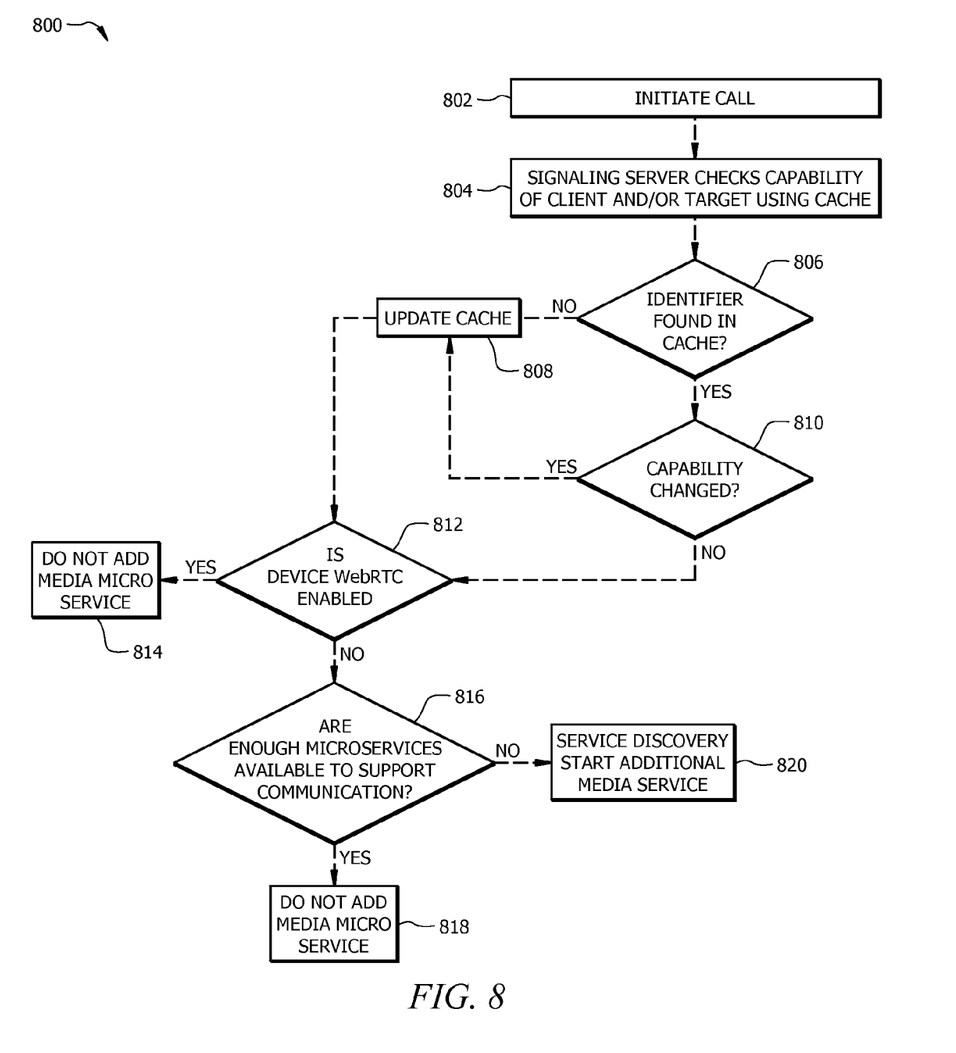
FIG. 8 is a flowchart of an embodiment of a dynamic allocation method utilizing the WebRTC system of FIG. 3.

FIG. 8 is a flowchart of an embodiment of a dynamic allocation method 800 utilizing the WebRTC system 300 of FIG. 3. The method 800 is implemented when, for example, a client wants to determine if a target is suitably configured to support browser-to-browser communications. In block 802, a call is initiated by the client. In some embodiments, the client initiates the call by sending the call message to the microservice in the signaling server as shown in FIG. 6. In block 804, the signaling server checks the capabilities of the client and/or the target using the index in the cache service of the cache. In some embodiments, the identifier (e.g., phone number, IMS number, etc.) of the client will be used to look up the client capability corresponding to the client identifier. Likewise, the identifier of the target will be used to look up the target capability corresponding to the target identifier.

In block 806, the cache checks to if the client identifier and/or the target identifier are found in the cache. If not, the cache is updated to include the client identifier and the capabilities of the client and/or updated to include the target identifier and the capabilities of the target as shown in block 808. If so, the cache compares the current capability of the client or target with the stored capability for that device in block 810. If a mismatch between the current capability and the stored capability exits, the cache is updated to reflect the current capability as shown in block 808.

After the cache has been updated in block 808 or a determination was made that the capability of the client and/or target has remained the same, the signaling server makes a determination of whether the target and/or the client is capable of browser-to-browser communications (WebRTC-enabled) in block 812. If so, no microservices in the media server are added as shown in block 814. If not, the service discover server makes a determination as to whether enough microservices are available in the media server (or media servers) to support communication between the client and the target as shown in block 816. If there are sufficient microservices currently operating, no microservices in the media server are added as shown in block 818. If there are not sufficient microservices operating in the media server to support communications, the service discovery server take steps to initiate further microservices in the media servers as shown in block 820. While not shown in FIG. 8, after block 814, block 818, or block 820 are completed, the communications (e.g., video call) are initiated between the client and the target.

Figure 9:
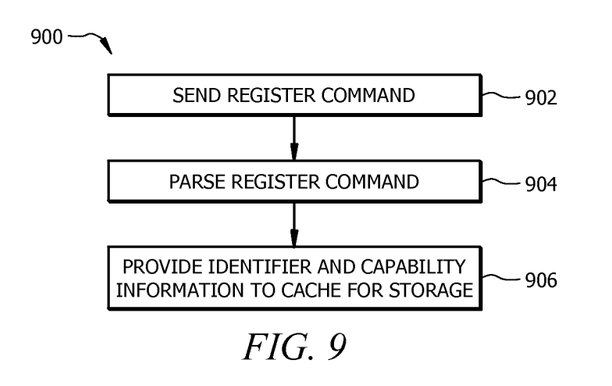
FIG. 9 is a flowchart of an embodiment of a registration method utilizing the WebRTC system of FIG. 3.

FIG. 9 is a flowchart of an embodiment of a registration method 900 utilizing the WebRTC system 300 of FIG. 3. The method 900 is implemented when, for example, a client wants to register or update its service capability with a cache service. In block 902, the client sends a register command to the microservice in the signaling server. In an embodiment, the register command is forwarded to the target using the IMS. In block 904, the signaling server parses the register command to extract the client identifier (e.g., the phone number, the IMS number, etc.) and information about the capability of the client from the register command. In block 906, the signaling server provides the client identifier and the capability information to the cache for storage using the distributed cache service.

Figure 10:
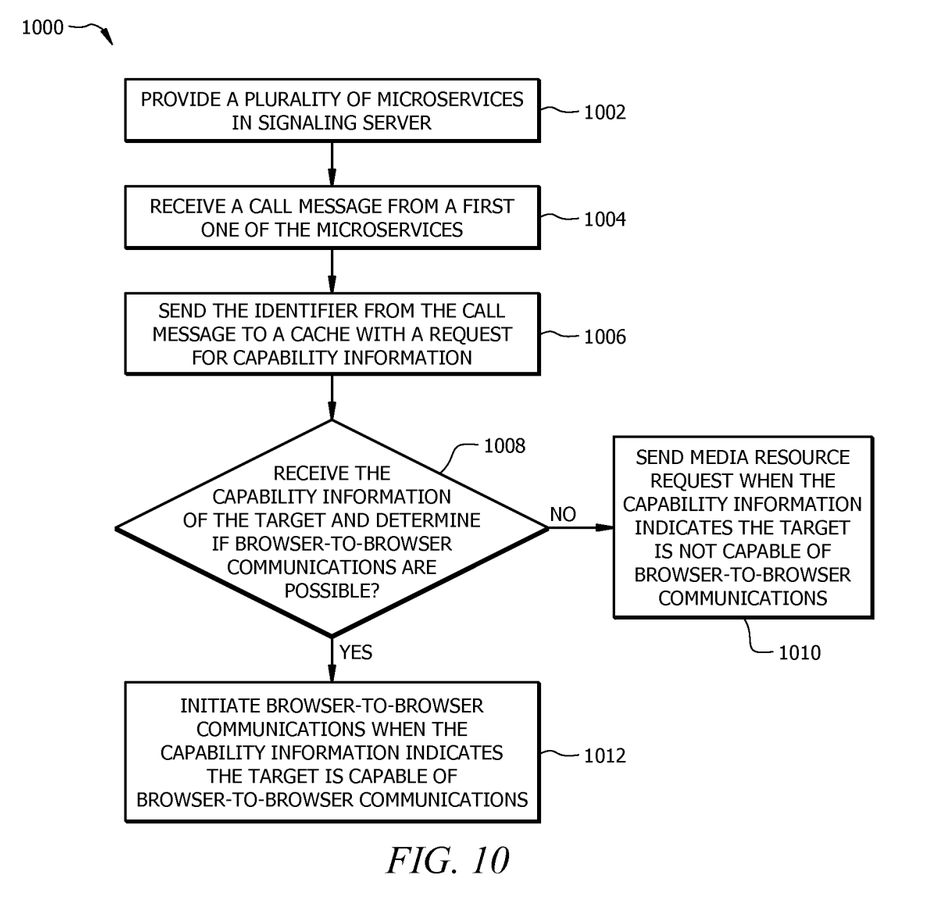
FIG. 10 is a flowchart of an embodiment of a method of dynamically allocating media server resources utilizing the WebRTC system of FIG. 3.

FIG. 10 is a flowchart of an embodiment of a method 1000 of dynamically allocating media server resources utilizing the WebRTC system 300 of FIG. 3. The method 1000 is from the perspective of the signaling server. The method 1000 is implemented when, for example, a client capable of browser-to-browser communications enlists the services of a signaling server to establish communications with a target that may or may not be capable of browser-to-browser communications. In block 1002, a plurality of microservices is provided in the signaling server. In block 1004, a call message is received by a first one of the microservices from a client capable of browser-to-browser communications. The call message includes an identifier specifying a target.

In block 1006, the identifier is sent by the first one of the microservices to a cache with a request for capability information of the target. The cache is configured to retrieve the capability information of the target using the identifier. In block 1008, the first one of the microservices receives the capability information of the target from the cache in response to the request for the capability information and determines if browser-to-browser communications are possible in accordance with the capability information received. In block 1010, the first one of the microservices sends a media resource request to a service directory server operably coupled to a plurality of media servers when the capability information of the target indicates that the target is not capable of browser-to-browser communications. In block 1012, the first one of the microservices initiates browser-to-browser communications between the client and the target when the capability information of the target indicates the target is capable of browser-to-browser communications.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed:

1. A service discovery server capable of dynamically allocating media server resources, comprising:
a memory comprising instructions; and
a processor operably coupled to the memory, the processor executing the instructions to:
receive a media resource request from one of a plurality of microservices in a signaling server, the media resource request indicating that a target is not capable of browser-to-browser communications with a client;
allocate at least one of the plurality of microservices in a media server in response to receipt of the media resource request such that the client is capable of engaging in communications with the target, each of the plurality of microservices in the media server being configured to convert a data stream into a format that is compatible with the target;

determine whether additional microservices are needed to support the communications between the client and the target prior to the communications between the client and the target starting; and allocate the additional microservices to the client and the target when a number of the microservices needed to support the communications between the client and the target is below a predetermined threshold.

2. The service discovery server of claim 1, wherein the processor is configured to communicate with the signaling server through a first discovery agent in the signaling server, and wherein the processor is configured to communicate with the media server through a second discovery agent in the media server.

3. The service discovery server of claim 1, wherein the processor is configured to allocate the additional microservices in a second media server to support the communications between the client and the target.

4. A method of dynamically allocating media server resources, comprising:

receiving, by a service discovery server capable of dynamically allocating media server resources, a media resource request from one of a plurality of microservices in a signaling server, the media resource request indicating that a target is not capable of browser-to-browser communications with a client;

allocating at least one of the plurality of microservices in a media server in response to receipt of the media resource request such that the client is capable of engaging in communications with the target, each of the plurality of microservices in the media server being configured to convert a data stream into a format that is compatible with the target;

determining whether additional microservices are needed to support the communications between the client and the target prior to the communications between the client and the target starting; and allocating the additional microservices to the client and the target when a number of the microservices needed to support the communications between the client and the target is below a predetermined threshold.

5. The method of claim 4, further comprising communicating with the signaling server through a first discovery agent in the signaling server, and communicating with the media server through a second discovery agent in the media server.

6. The method of claim 4, further comprising allocating the additional microservices in a second media server to support the communications between the client and the target.

7. A service discovery server capable of dynamically allocating media server resources, comprising:

a memory comprising instructions; and a processor operably coupled to the memory, the processor executing the instructions to:

receive a media resource request from one of a plurality of microservices in a signaling server, the media resource request indicating that a target is not capable of browser-to-browser communications with a client; and allocate at least one of the plurality of microservices in a media server in response to receipt of the media resource request such that the client is capable of engaging in communications with the target, each of the plurality of microservices in the media server being configured to convert a data stream into a format that is compatible with the target, the processor being configured to allocate additional microservices to the client and the target when a number of the microservices needed to support the communications between the client and the target is below a predetermined threshold.

8. The service discovery server of claim 7, wherein the processor is configured to communicate with the signaling server through a first discovery agent in the signaling server.

9. The service discovery server of claim 7, wherein the processor is configured to communicate with the media server through a second discovery agent in the media server.

10. The service discovery server of claim 7, wherein the processor is configured to allocate the additional microservices in a second media server to support the communications between the client and the target.

* * * * *